United States Patent [19]

Rasmussen

[11] Patent Number: 4,679,979
[45] Date of Patent: Jul. 14, 1987

[54] METHOD OF UNLOADING LARGE CONTAINERS

[75] Inventor: Robert Rasmussen, Berlin, N.J.

[73] Assignee: Accurate Industries, Inc., Williamstown, N.J.

[21] Appl. No.: 806,911

[22] Filed: Dec. 9, 1985

Related U.S. Application Data

[62] Division of Ser. No. 468,319, Feb. 22, 1983, Pat. No. 4,599,040.

[51] Int. Cl.$^4$ ............................................. B60P 1/48
[52] U.S. Cl. .................................................... 414/786
[58] Field of Search .............. 414/786, 467, 480, 498, 414/499, 500, 501, 507, 529, 530, 531, 532, 533, 534, 535, 536, 537, 538, 539, 575; 298/12, 15, 14, 16

[56] References Cited

U.S. PATENT DOCUMENTS

| | | | |
|---|---|---|---|
| 1,561,157 | 11/1925 | Greer | 414/500 X |
| 3,130,847 | 4/1964 | Dempster et al. | 414/499 X |
| 3,147,999 | 9/1964 | Daniels | 298/14 X |
| 3,400,844 | 9/1968 | Overstreet | 414/500 |
| 3,450,285 | 6/1969 | Robinson | 414/500 |
| 3,606,059 | 9/1971 | Haberle, Jr. | 298/15 X |
| 3,608,920 | 9/1971 | Rubin | 280/33.99 T |
| 3,701,443 | 10/1972 | Van Der Lely | 206/518 X |

FOREIGN PATENT DOCUMENTS

| | | | |
|---|---|---|---|
| 1124421 | 2/1962 | Fed. Rep. of Germany | 220/8 |
| 1181635 | 11/1964 | Fed. Rep. of Germany | 414/30 |

Primary Examiner—Frank E. Werner
Attorney, Agent, or Firm—Steele, Gould & Fried

[57] ABSTRACT

A method for unloading a plurality of roll-off containers from a special trailer is disclosed. A plurality of six roll-off containers are stacked to form two similar nests of at least two containers each, with the lowermost container of each nest oriented in horizontal alignment and having its bottom rail resting upon the rollers of the trailer. The two nests of containers are placed upon the trailer in longitudinal juxtaposition for transportation purposes. Upon reaching the destination, the two nests of containers are unloaded by a single driver without requiring any external, additional equipment. During unloading, the trailer is backed and suddenly stopped in repeated stages to employ inertial forces to move the nests of containers relative to the trailer until the nests of containers travel the length of the trailer and drop upon the ground.

4 Claims, 10 Drawing Figures

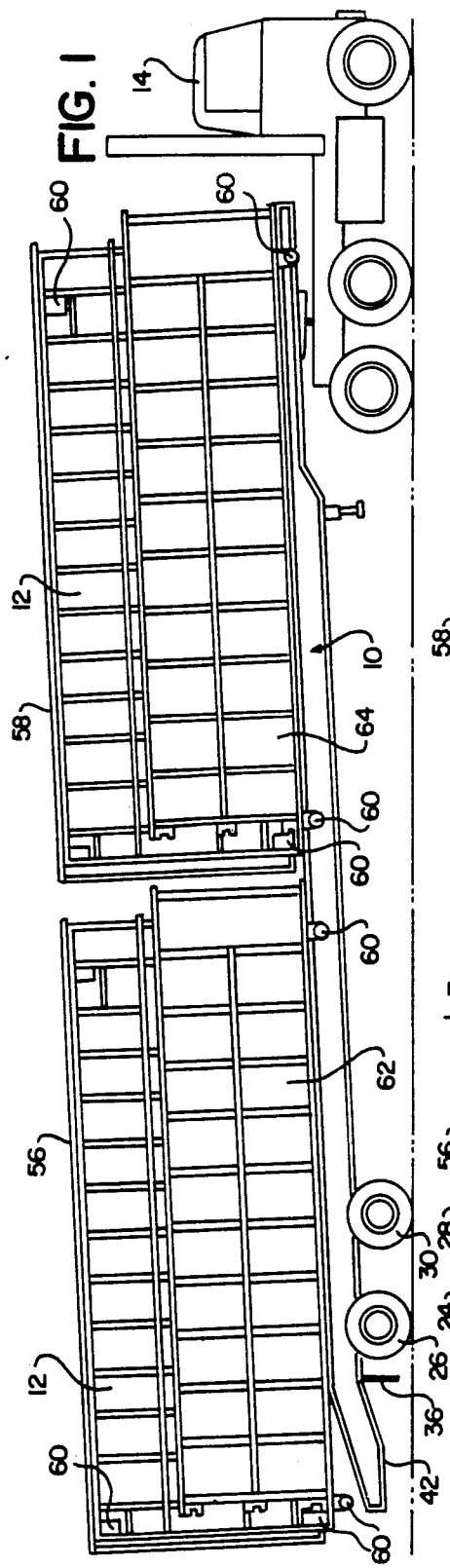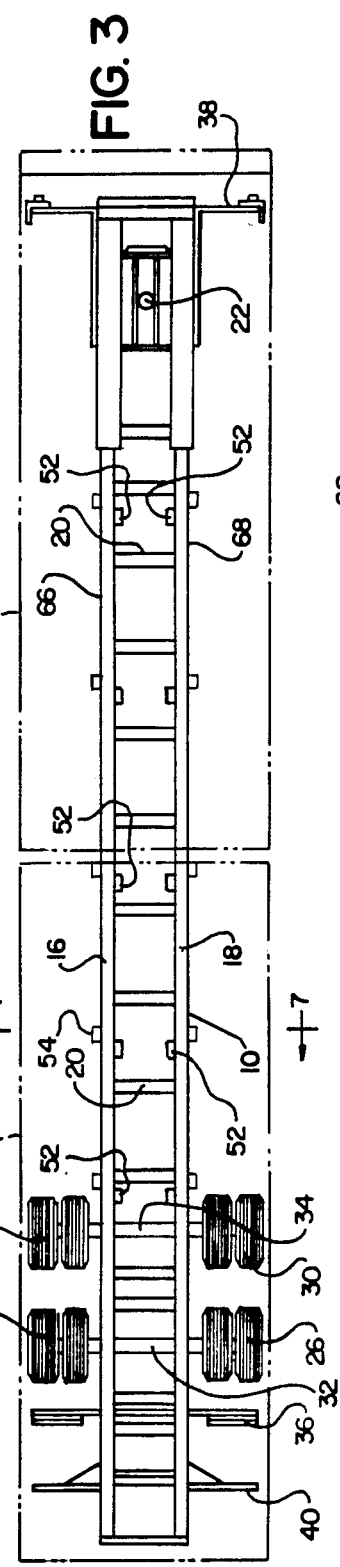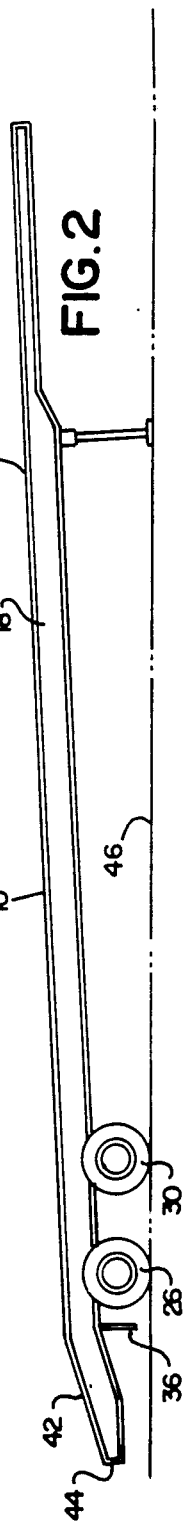

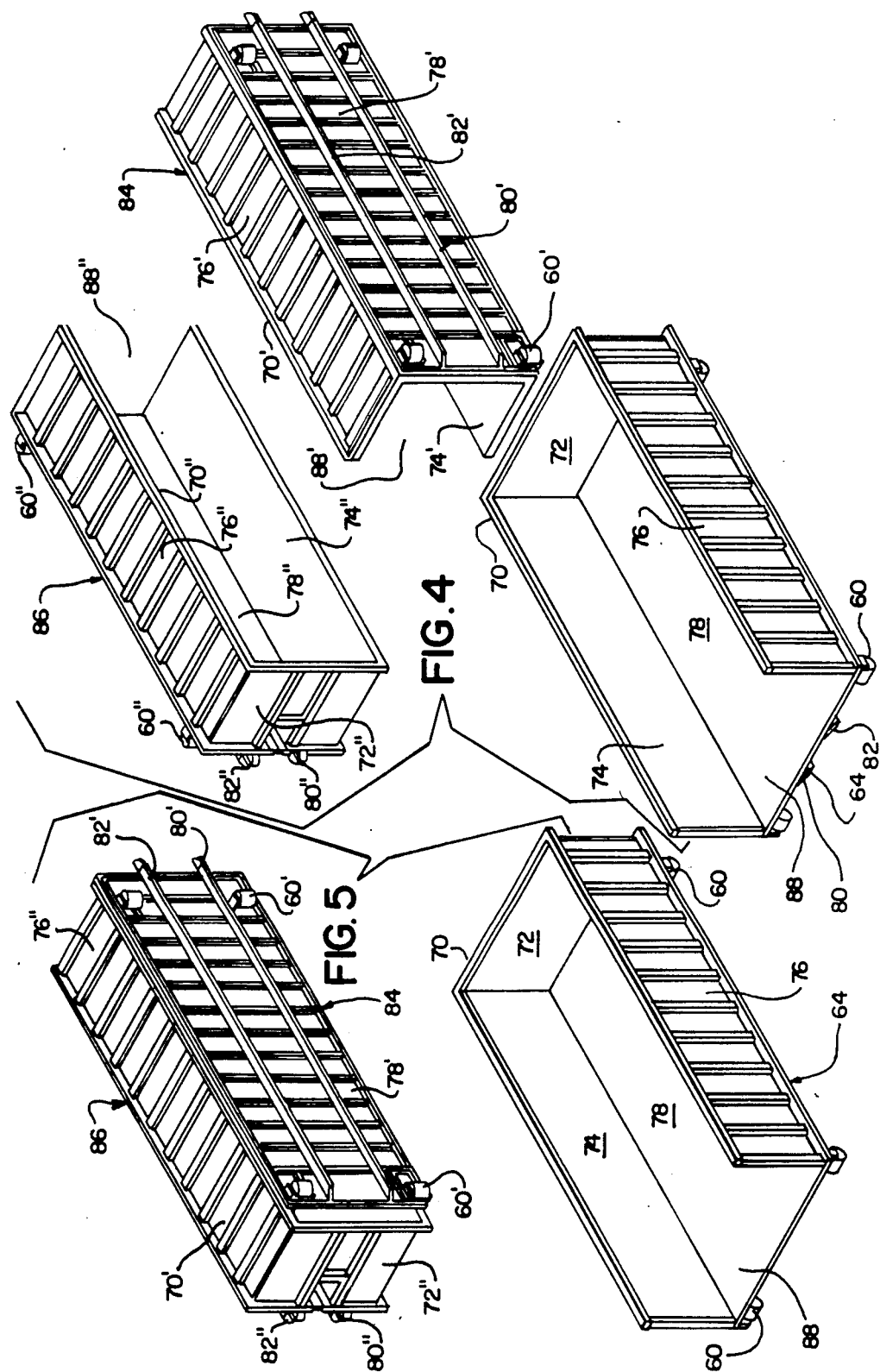

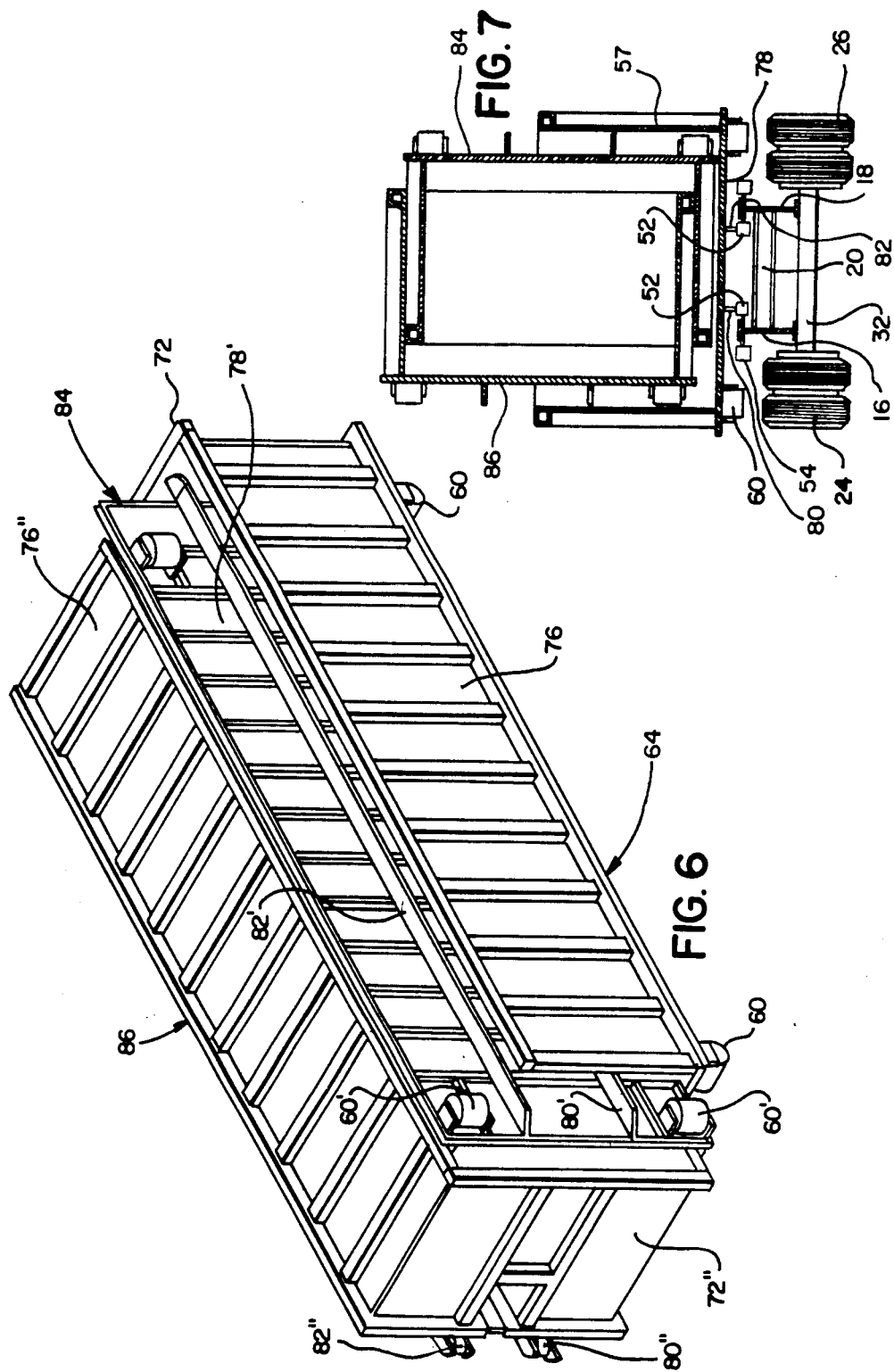

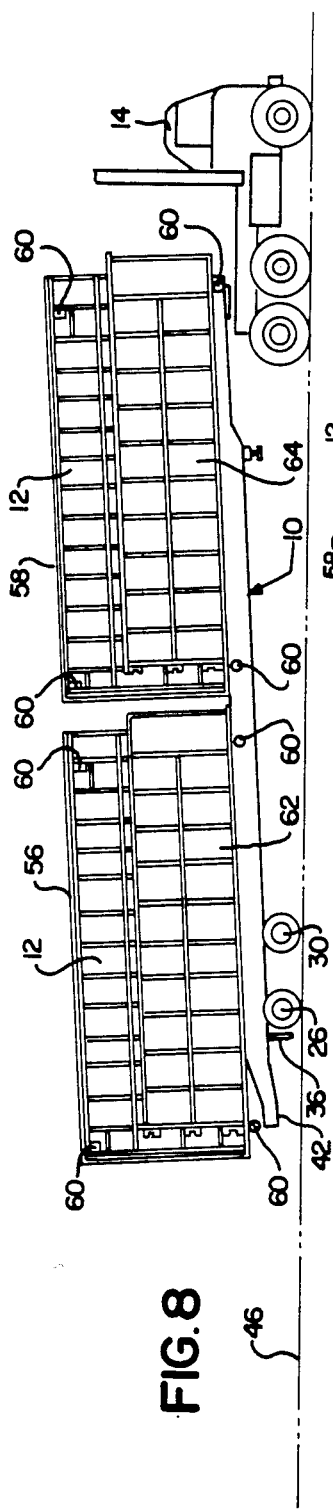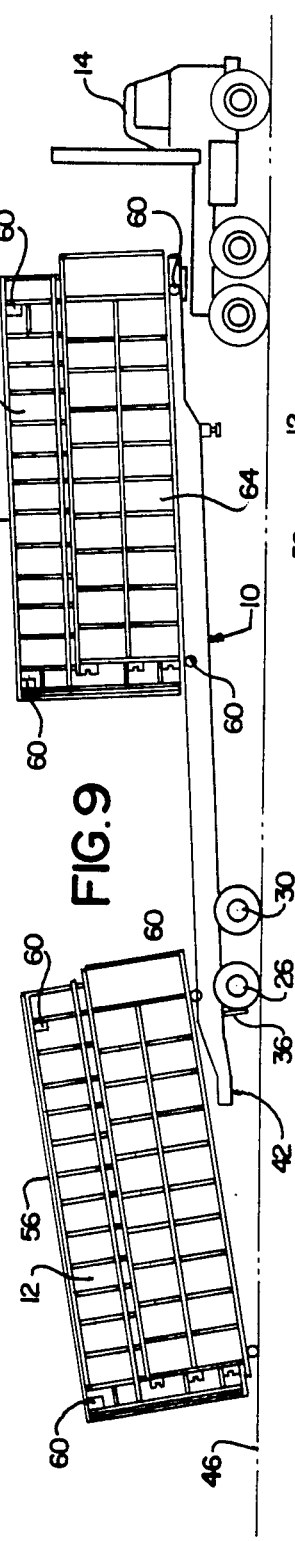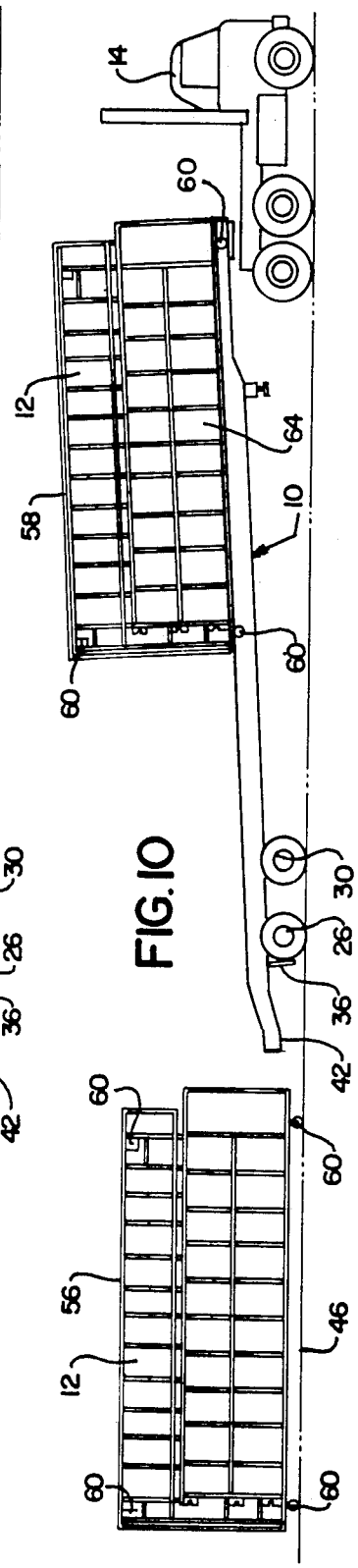

METHOD OF UNLOADING LARGE CONTAINERS

This is a division, of application Ser. No. 468,319, filed Feb. 22, 1983, now U.S. Pat. No. 4,599,040.

FIELD OF INVENTION

This invention relates generally to the field of highway transporation equipment, and more particularly, is directed to a method and apparatus for transporting large trash containers from the place of manufacture to the premises of the ultimate user.

BACKGROUND OF THE INVENTION

The use of large roll-off trash containers in and about building construction sites, commercial establishments and certain industrial locations is well known and such large containers are popularly employed as local points of disposal for all kinds waste and other materials which are intended to be discarded. It is usual to both place and remove such large containers when filled or when empty by employing specially designed hoists. The hoists are cooperatively designed for use with the large trash containers whereby such containers can easily be transported, either when loaded or empty, as necessary to satisfy the local conditions of use.

The large roll-off trash containers are usually constructed of standardized dimensions to provide the desired capacity, which capacity is generally designated in cubic yards. The containers are designed with bottom rails suitable for cooperative rolling engagement on either inside or outside roller systems which are substantially uniformly employed on the hoists of various manufacturers. The roll-off containers are characterized by sturdy, welded steel construction with an open top, a steel floor to which the bottom rails are affixed and enclosing side walls. The rear side wall is usually a door which is pivotally secured to the remainder of the side wall construction in a hinged interconnection to provide a rear, horizontally openable door. One of the most common trash container sizes has a capacity of 30 cubic yards, is 22 feet in length, 8 feet in width and has side walls which are 62 inches high. Typically, the side wall construction comprises 11 gauge plate sides and 11 gauge steel tubes of 3 inch by 5 inch dimensions spaced 24 inches on center. The floor is usually 3/16 inch steel plate with bottom affixed 3 inch channel cross sills and 2 inch by 6 inch rails. The doors are usually fabricated similarly to the side walls.

After the large containers are fabricated at the factory, they are painted and prepared for delivery to the customer. It is now the common practice to utilze a trailer to haul a plurality of completed trash containers to the place of intended use. Keeping in mind the usual interstate trucking regulations, the overall length of a tractor and trailer must be limited, usually to 60 feet overall length with a standard maximum width of 102 inches. Maximum overall height is generally limited to 13 feet, 6 inches.

With the above dimensional limitations in effect, in the past and up until the present invention, it was the common practice to employ a flatbed trailer for transportation of the large roll-off containers. The trailers were constructed of suitable length to support and transport two trash containers in end-to-end juxtaposition. Usually, a trailer 45 feet in length was found to be adequate for this purpose. In order to make the most economic use of the 45 foot trailer, the prior workers in the art usually shipped four trash containers per trailer by nesting two pairs of containers. This was accomplished, by turning the trash containers on their sides and by interleaving one pair of trash containers at the front half of the trailer and one pair of trash containers at the rear half of the trailer. By so loading the trailer, the highway regulations regarding overall length, width and heigth of the loaded trailer could be rather easily complied with. It will be appreciated however that upon consideration the total value of the trash containers and further considering the costs in transporting such large and bulky articles over a highway, the delivery costs involved constitute a significant factor in the overall costs of each container. This transportation cost must be calculated and included in the total container cost to be recovered at the time the container was sold. In view of the relatively high cost of delivery when considering the nature and cost of the article itself, the prior workers in this field have been seeking improved methods and apparatus for delivery of the finished trash containers at reduced overall costs.

SUMMARY OF THE INVENTION

The present invention relates generally to the field of large trash containers, and more particularly, is directed to an improved method and apparatus for simultaneously carrying a plurality of large roll-off containers over interstate highways for delivery to the point of use.

The method and apparatus of the present invention contemplates the use of a novel structural steel trailer that employs a pair of longitudinally aligned, transversely spaced main rails for support of the trash containers in a manner which completely eliminates the usual flat bed construction of the presently available trailers. The main rails are designed and dimensioned to simulate the construction of conventional hoists of the type which employ either or both inside and outside rollers. The usual inside-outside roller type hoist is equipped with a plurality of longitudinally spaced outside rollers and left and right longitudinal divider bars for supporting a plurality of longitudinally spaced inner rollers. In this manner, the trailer of the present invention can be utilized substantially universally to transport trash containers which are designed for use with all popularly employed hoist systems.

The method of the present invention contemplates nesting a first plurality of three large roll-off containers on the forward half of the trailer and a second plurality of three large roll-off containers on the rearward half of the trailer in a manner to permit a single trailer to be employed to transport trash containers, six at a time. The loading permits transportation over interstate highways in a manner which complies with all known length, height and width regulations. By employing the method and apparatus of the present invention, six large trash containers now can simulataneously be transported by a single tractor trailer apparatus in lieu of the former limit of only four trash containers per tractor trailer unit. By employing the method and apparatus of the present invention, the transportation costs for delivery of completed large roll-off containers can thereby be reduced by a factor of substantially fifty percent.

In order to accomplish the significant reduction in transportation costs, the front and rear nests of roll-off containers are each arranged with the bottom, or lowermost container in usual, up-right orientation wherein the bottom positioned rails can be applied over the trailer inside or outside rollers in the same manner that the rails were designed for employment with the hoist rollers on the job site. Accordingly, the trailer inside or outside rollers will support each lowermost front and rear trash container in a manner to permit rolling engagement of the trash containers on the trailer.

The second and third roll-off containers of each nest are oriented on their respective sides and are interleaved and placed within the sidewalls of the lowermost containers. In this manner, three roll-off containers will be interleaved and nested on the forward portion of the trailer and a similar arrangement of three roll-off containers will be positioned on the rearward portion of the trailer. It is noteworthy that by constructing the trailer with main rails and inside and outside rollers in place of the former flatbed trailer construction, the over-all height of the trailer and roll-off container nest combination can be significantly reduced by some three to five inches inasmuch as the containers will be supported directly on the rollers. This allows the nested three trash container arrangement, when supported upon the rollers of the structural trailer members to meet the height restrictions imposed upon highway transportation vehicles, a condition which heretofore could not be achieved when utilizing the usual flatbed trailer construction to support a nested three container configuration.

The structural main rails of the trailer are supported upon the front and rear wheels in a manner to normally slope the trailer from front to rear to facilitate unloading procedures. The rear end of the trailer rearwardly of the rear wheels is constructed to provide an unloading ramp with a fifteen degree slope. Preferably, the unloading ramp terminates approximately fifteen inches above the ground. In this manner, the trailer can be constructed to provide a self unloading feature whereby the angularity of the trailer and the slope of the rear ramp can be employed to allow a single driver to self unload the pair of nested trash containers. In practice, upon reaching the destination, the driver removes the chains which are employed about the nested containers during highway transportation procedures. Then, by backing up and suddenly stopping in successive short stages, the forces of inertia will function to cause the pairs of nested containers to roll rearwardly until rearwardmost nest of containers drops free of the trailer. The procedure can then be repeated until the forward nest of containers drops rearwardly of the trailer. A free drop of fifteen inches at the rear of the rear unloading ramp has been chosen both to provide sufficient rear highway clearance and to assure that the containers will not be damaged as they fall from the trailer.

In view of the severe height restrictions which are presently in force in interstate highways, the clearance between the rear wheels of the trailer and the rearward nest of containers was found to be critical. Because of the load involved, it was found necessary to increase the size of the rear axle and to increase the size of the rear tires to carry the load. In view of the criticality of the rear wheel clearance, it was found to be advantageous to block the larger axle to thereby sufficiently raise the rear of the trailer. Experiments have proven that a rear wheel clearance of six and one-half inches unloaded and five inches when loaded will be satisfactory for transporting six containers in two nested pairs on a single trailer.

In order to achieve the maximum economy and to comply with the sixty foot overall length limitation, a trailer having an overall length of forty-five feet has been found to be optimum for the purpose. The overall size of the containers when nested in pairs of threes and placed upon the trailer in end-to-end juxtaposition produces an overall load length of approximately forty-seven feet, a condition that can be readily handled on a forty-five foot trailer. As above set forth, the trailer rear ramp rearwardly slopes to provide fifteen inch rearward road clearance. While it has been found that the rearward ramp slope is not absolutely necessary, it has proved to be beneficial to aid in the self unloading procedures. However, the rearward drop must be minimized to as great an extent as possible so as not to damage the trash containers by the forces of the drop when the nested trash containers are self-unloaded from the trailer. By employing the structural hoist-type trailer construction and the particular method of nesting and loading the trash containers on the trailer, all of the interstate highway regulations pertaining to the length, width and height of loads can be observed, and at the same time, a significantly increased load can be carried by substantially the same equipment and personnel that was formally utilized.

It is therefore an object of the present invention to provide an improved method and apparatus for transporting roll-off containers of the type set forth.

It is another object of the present invention to provide a novel method and apparatus for transporting roll-off trash containers which includes generally a trailer comprising a pair of side by side longitudinal main rails, inside and outside rollers supported by the rails and a plurality of six trash containers which are adapted to be supported and carried upon the trailer in a manner to comply with interstate highway load size limitations.

It is another object of the present invention to provide a novel method and apparatus for transporting trash containers wherein a plurality of six roll-off containers are simultaneously carried upon a trailer, the six containers being subdivided into two sets of nested containers comprising three containers each.

It is another object of the present invention to provide a novel method and apparatus for transporting trash containers that includes a structural steel trailer, a plurality of six roll-off containers adopted for simultaneous transportation upon the trailer and means to nest the trash containers relative to each other in two pairs of three containers each whereby the entire load can comply with interstate highway, height, width and length limitations.

It is another object of the present invention to provide a novel method and apparatus for transporting roll-off containers which comprises an elongate structural trailer fabricated with a pair of side-by-side main rails, inside and outside rollers supported upon the rails, means to stack and carry a plurality of six trash containers upon the rails and means to unload the trash containers from the trailer at the point of delivery without the need to provide any additional unloading equipment.

It is another object of the present invention to provide a novel method and apparatus for transporting roll-off type trash containers that is simple in design, trouble-free in operation and highly efficient when in use.

Other objects and a fuller understanding of the invention will be had by referring to the following description and claims of a preferred embodiment, taken in conjunction with the accompanying drawings, wherein like reference characters refer to similar parts throughout the several views and in which:

BRIEF DESCRIPTION OF THE DRAWINGS

FIG. 1 is a side elevational view of a tractor and trailer fully loaded with a plurality of six roll-off containers which are stacked in two nests for transportation in accordance with the teachings of the present invention.

FIG. 2 is a a side elevational view of the trailer without the load.

FIG. 3 is a top plan view of the trailer showing the nests of containers in phantom lines to illustrate the trash container overhang.

FIG. 4 is an exploded, perspective view showing the arrangement and orientation of three containers prior to nesting.

FIG. 5 is a partially exploded, perspective view of three containers showing two containers in nested relationship prior to nesting with the third container.

FIG. 6 is a perspective view showing three containers in fully nested relationship prior to shipping.

FIG. 7 is a cross-sectional view taken along line 7—7 on FIG. 3, looking in the direction of the arrows.

FIGS. 8, 9 and 10 are schematic side elevational views showing trash container unloading procedures at the place of delivery.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIG. 1 a trailer 10 which is specially designed and suited for carrying a plurality of roll-off trash containers 12. The trailer 10 is moved in the usual manner by a conventional tractor 14 which is suitably connected in a manner well known to those skilled in the art for highway transportation purposes.

As best seen in FIGS. 2 and 3, the trailer 10 comprises essentially a pair of longitudinally extending, transversely spaced structural steel main rails 16, 18 which rails extend the entire length of the trailer 10. A plurality of cross members 20 are formed of suitable structural steel shapes and are welded or otherwise connnected between the rails 16, 18 to form an extremely sturdy, structurally secure trailer construction. In well known manner, the trailer 10 is equipped with a forward king pin 22 for connection to the tractor 14 when the trailer is loaded for trash container transport purposes. Left and right pairs of rear wheels 24, 26 and 28, 30 are rotatively carried on the transverse axles 32, 34 in manner well known to those skilled in the trailer construction art. In the usual manner, transversely mounted mud flaps 36 and front and rear light channels 38, 40 can be provided to comply with any known trailer construction requirements.

As best seen in FIGS. 1 and 2, the main rails 16, 18 terminate rearwardly in a sloped unloading ramp 42, which unloading ramp preferably declines at an angle of fifteen degrees from the plane defined by the tops of the main rails 16, 18. The unloading ramp 42 terminates above ground level in a tail board 44 for self unloading purposes. The tail board 44 is preferably fabricated of structural steel, the same as the remainder of the trailer and can be welded in known manner to form a sturdy rear end construction. The unloading ramp 42 terminates above the road surface or the ground 46 to provide a roll-off container drop that must be sufficient for highway clearance and at the same time must be minimized so as not to damage the trash containers or other transported products, such as compactors, when the transported equipment is unloaded. A drop of approximately twenty-one inches has been found suitable for the purpose whereby the transported containers or compactors will not be damaged by a free fall of this magnitude upon unloading.

As best seen in FIG. 3, the main rails 16, 18 are provided at or near their top surfaces 66, 68 with necessary construction components to rotatively carry a plurality of inner rollers 52. In known manner, a plurality of outer rollers 54 are also rotatively supported upon the longitudinally extending rails, 16, 18. It should be noted that the use of both a plurality of inside and outside rollers and the necessary construction components for rotatively carrying the rollers is well known in the art and is substantially the standard in the industry for construction of hoists. Existing hoist constructions (not shown) utilizing inside and outside rollers are conventionally provided for unloading and loading roll-off trash containers so as to be suitable for use with containers having bottom rails which are spaced for use with either inside rollers or outside rollers.

The same general construction has been adopted for the trailer 10 of the present invention whereby the trailer can be utilized to load, unload and transport roll-off trash containers of the type designed for use with hoists having either inside rollers or outside rollers in the known manner. The inside rollers 52 and the outside rollers 54 are rotatively affixed to the longitudinal main rails 16, 18 in known manner to rotatively receive and support the container bottom rails 80, 82 (FIG. 4) to facilitate movement of a trash container 12 longitudinally along the main rails 16, 18.

In the preferred construction, the overall length of the trailer 10 illustrated in FIGS. 2 and 3 is forty-five feet for carrying two nests 56, 58 containing three roll-off containers 64, 84, 86 each. Assuming that the roll-off trash containers will be a popular size, for example, twenty-two feet in length, then the two nests of containers will forwardly overhang the trailer by approximately one foot and rearwardly overhang the trailer by approximately one foot. With approximately two inches clearance between the container nests 56, 58 there will then be a total overall trailer length of forty-seven feet, which dimension, when taken in combination with the free length of the tractor 14, will be sufficient to meet the maximum sixty foot overall length legal limitation imposed in many states for interstate highway truck transportation.

It is noteworthy in FIG. 1 that inasmuch as the bottom rollers 60 of the lowermost trash containers 62, 64 of each nest 56, 58 of containers are not utilized to support the nests during transportation, the rollers will be positioned below the respective tops 66, 68 of the main rails 16, 18, thereby reducing the overall height of the trash container nests 56, 58 as they rest upon the trailer 10. In this manner, when two of the roll-off containers 12 are turned on their side, as illustrated, sufficient height reduction can be achieved by so positioning the rollers 60 as not to exceed the interstate highway total height limitations.

Referring now to FIGS. 4, 5, 6, and 7, the method of nesting a plurality of roll-off containers will now be described. As above set forth, each nest of containers 56, 58 comprises three similar groups consisting of a lowermost or support container 62, 64, a middle container 84 and an upper container 86. The nested containers are suitably arranged and suitably retained to permit six roll-off trash containers 12 to be simultaneously transported in a legal manner upon the trailer 10. Starting with the containers illustrated in FIG. 4, it will be noted that the hinged rear doors (not illustrated) will first be removed from association with the trash container side walls 70 for proper interfitting purposes. Thus, the side walls 70, 70', 70" respectively comprise an integral front wall 72, 72', 72" and rearwardly extending left and right side walls 74, 74', 74", 76, 76', 76" respectively. The front wall 72, 72', 72" and the left and right side walls 74, 74', 74", 75, 76', 76" respectively rise from the container floors 78, 78', 78" and are secured thereto in the usual manner, such as by welding.

As illustrated, the lowermost trash container 62 or 64 is placed upon the trailer 10 with its bottom rails 80, 82 in rolling engagement upon either the inner trailer rollers 52 or the outer trailer rollers 54 (depending upon the design of the container being shipped) to permit rolling movement of the lowermost trash container relative to the trailer 10 for unloading and loading purposes. Preferably, the container front wall 72 is positioned to overhang the front of the trailer by approximately one foot. See FIG. 3.

As above set forth, the rollers 60 of the lowermost container 62 or 64 extend below the tops 66, 68 of the trailer main rails 16, 18 to thereby reduce the overall height requirements of the system. The rear opening 88 which is provided upon removal of the container rear door (not shown) preferably positions to face rearwardly as illustrated. The containers 84, 86 are oriented as illustrated in FIG. 4 so that the rear opening 88' of the middle container 84 faces in the same direction as the opening 88 of the lowermost container and the rear opening 88" of the upper container 86 is offset through one hundred and eighty degrees.

Next, the other two containers 84, 86 of the nest 56 or 58 are turned through ninety degrees so that the left side 74' of middle container 84 faces downwardly and the left side 74" of the other container 86 also faces downwardly. The respective rollers 60', 60" of the containers 84, 86 are positioned to face in opposite directions as illustrated. The open rear 88' of the middle container 84 faces rearwardly and the open rear 88" of the upper container 86 faces forwardly whereby the containers 84, 86 may be readily intermeshed by simply urging the containers together with the left wall 74" of the container 86 resting upon the left wall 74' of the middle container 84.

As illustrated in FIG. 5, the containers 84, 86 after being positioned on their respective sides can be nested together to form a generally hollow quadrilateral configuration. The floor 78' of the container 84 faces oppositely outwardly away from the floor 78" of the container 86. As best seen in FIG. 6, the pair of side-nested containers 84, 86, when fully urged to their interlocked position as illustrated in FIG. 5, can then be lowered into the interior of the lower container 62 or 64 in the manner illustrated. Thus, three roll-off containers 62, 84, 86 or 64, 84, 86 can be nested together to require the least volume during transportation by providing the minimum overall dimensions for storing three such containers.

As shown in FIG. 7, the container nests 56, 58 easily ride upon the trailer 10 for highway transportation purposes without undue width requirements. Preferably, once the nests of containers 56, 58 are properly supported upon the rollers 52 or 54 of the trailer 10, chains of suitable number and strength (not shown) can be applied about the nested container cargo to prevent shifting during transportion. When the load is safely transported to the point of disposal, the chains can then be removed for roll-off container unloading purposes in the manner hereinafter described.

Referring now to FIGS. 8, 9, and 10, there is illustrated a preferred procedure for self unloading the nests (56, 58) of containers after the cargo reaches the end of the trip. It will be appreciated that the nests 56, 58 could comprise three containers each as illustrated, or optionally could comprise one container each or two containers each for self unloading purposes.

Starting with the container nests positioned as illustrated in FIG. 8, with the chains (not shown) removed, the driver can slowly back the trailer 10 by reversing the tractor transmission in known manner. With the cargo and trailer slowly moving to the rear, the driver can be instructed to put his foot upon the brake to suddenly stop the tractor 14 and of course the affixed trailer 10. Inasmuch as the cargo of nested roll-off containers is no longer lashed, chained or otherwise secured to the trailer 10, the inertia of the containers will function to cause the bottom rails 80, 82 of the lowermost containers 62, 64 to roll over the inner or outer rollers 52, 54 which are provided on the trailer, thereby allowing the container nests 56, 58 to roll rearwardly and in turn down the sloped unloading ramp 42.

Once a portion of a lowermost container 62 of the nest 56 has come to rest upon the ground surface 46 as shown in FIG. 9, the driver can then place the tractor motor in a forward gear to slowly move the trailer forwardly. In this manner, the front end of the nest 56 will be caused to roll down the sloped unloading ramp 42 and drop to the ground whereby both the front and rear rollers 60 of the lowermost container 62 will then rest upon the ground surface. The backing, stopping and forward movement procedures can be repeated for the front nest 58 to thereby facilitate complete unloading of the six trash containers by the driver of tractor 14.

Once unloaded, the tractor 14 and the attached trailer 10 can then be returned to the factory to pick up another load of roll-off containers 12. The ultimate user, by employing his existing hoist (not shown) or other equipment can readily unnest the three intermeshed containers for use in his business in the known manner, at no additional cost to the container manufacturers.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A method for unloading a plurality of at least four large containers, each of the type including a floor, a right side wall, a left side wall, a front wall and at least one bottom rail affixed to the floor from a trailer to the ground by moving the trailer, the trailer being of the type having at least one main rail having a top surface and a plurality of rollers rotatively secured to the main rail comprising the steps of positioning a first portion of at least two of the containers upon a forward part of the trailer and supporting a bottom rail of only one of the containers on some of the rollers;

nesting the first portion of containers prior to moving, the nest comprising revolving the said container not having its bottom rail on the rollers and resting a sidewall of the said container upon the floor of the container having its bottom rail supported on the roller;

positioning a second portion of at least two of the containers upon a rearward part of the trailer and supporting a bottom rail of only one of the second portion of the containers upon others of the rollers;

rearwardly moving the trailer a short distance and suddenly stopping the rearwardly moving trailer; and moving the first and second portions of the containers on the rollers relative to the trailer when the rearward trailer movement stops, and moving all of the containers off of the trailer.

2. The method of claim 1 and the futher step of nesting the second portion of the containers prior to moving, the nesting comprising revolving the said container not having its bottom rail on the rollers and resting a sidewall of the said container upon the floor of the container having its bottom rail supported on the rollers.

3. The method of claim 2 wherein the main rail terminates rearwardly in an unloading ramp that is positioned in spaced relationship above the ground and the moving of the containers comprises dropping separately the first portion of the containers and second portion of the containers through the space between the unloading ramp and the ground.

4. The method of claim 2 wherein the unloading is carried out without additional sxternal deivices.

* * * * *